United States Patent [19]

Kalfoun

[11] Patent Number: 4,935,720

[45] Date of Patent: Jun. 19, 1990

[54] APPARATUS FOR THE TRANSMISSION OF INFORMATION IN A RESTAURANT

[75] Inventor: Jean C. Kalfoun, Paris, France

[73] Assignee: K. M. Innovations, Paris, France

[21] Appl. No.: 265,619

[22] Filed: Oct. 31, 1988

[30] Foreign Application Priority Data

Oct. 30, 1987 [FR] France ................................ 87 15594

[51] Int. Cl.[5] ................................................ G06F 15/21

[52] U.S. Cl. .................................. 340/286.09; 186/38; 340/332; 364/401

[58] Field of Search ......... 340/286 R, 286 M, 309.15, 340/309.4, 332, 286.06, 286.09; 364/401, 404, 410; 186/38, 39

[56] References Cited

U.S. PATENT DOCUMENTS

| | | | |
|---|---|---|---|
| 3,254,335 | 5/1966 | Staten | 340/332 |
| 3,534,357 | 10/1970 | Purney, Sr. | 186/38 |
| 3,588,838 | 6/1971 | Felcheck . | |
| 4,128,757 | 12/1978 | Garner, Jr. . | |
| 4,133,530 | 1/1979 | Takaichi et al. | 273/85 G |
| 4,222,111 | 9/1980 | Sloan et al. | 340/286 R |
| 4,247,106 | 1/1981 | Jeffers et al. | 273/85 G |
| 4,286,323 | 8/1981 | Meday | 364/411 |
| 4,300,040 | 11/1981 | Gould et al. | 340/825.35 |
| 4,302,010 | 11/1981 | Kaenel | 273/54 C |
| 4,335,809 | 6/1982 | Wain . | |
| 4,388,689 | 6/1983 | Hayman et al. | 364/401 |
| 4,415,065 | 11/1983 | Sandstedt | 364/401 |
| 4,420,234 | 12/1983 | Doleisi et al. . | |
| 4,449,186 | 5/1984 | Kelly et al. | 364/407 |
| 4,485,398 | 11/1984 | Chapin, Jr. et al. | 358/50 |
| 4,530,067 | 7/1985 | Dorr | 364/401 |
| 4,547,851 | 10/1985 | Kurland | 364/401 |
| 4,701,849 | 10/1987 | Elden | 364/401 |
| 4,722,053 | 1/1988 | Dubno et al. | 364/401 |
| 4,777,488 | 10/1988 | Carlman, Jr. et al. | 340/825.72 |

*Primary Examiner*—Joseph A. Orsino
*Assistant Examiner*—Brent A. Swarthout
*Attorney, Agent, or Firm*—Herbert Dubno

[57] ABSTRACT

A waiter-restaurant information transfer system in which a principal unit in the kitchen has a set of buttons associated with respective tables or a keyboard which can be operated by food-preparation personnel to provide a display at its unit, at a board in the dining room and a region at which the waiter can pick up prepared food service items. When the waiter responds to the signal, at the second board, upon pickup of the food service item, he presses a push button or operates a keyboard to cancel the previous display.

9 Claims, 2 Drawing Sheets

APPARATUS FOR THE TRANSMISSION OF INFORMATION IN A RESTAURANT

FIELD OF THE INVENTION

My present invention relates to an apparatus for the transmission of information in a restaurant.

BACKGROUND OF THE INVENTION

In the patron rooms of a restaurant, generally speaking, the waiting and other personnel have a primary responsibility to satisfy the needs of and provide attention to the patrons. If a waiter regularly absents himself from the patron rooms of the restaurant, for example to deliver orders to the kitchen or to pick up such orders, or even simply to check whether prior orders are ready, the service which the patron expects and is entitled to cannot be efficiently provided. To data there has been no effective means of communication between the kitchen and the patron rooms, i.e. the eating rooms of a restaurant which can minimize the inattention to the patrons needs and the time for which a waiter must leave these rooms to check on food preparation or the preparation of aperitifs or drinks at the bar.

There is no truly effective system of which I am aware which is capable of indicating to a waiter that the plates, destined for one of the tables in his charge, are ready in the kitchen.

As a consequence, a diligent waiter must regularly return to the kitchen to verify if certain plates have been prepared and are ready for service upon the patron.

These goings and comings between the eating room of the restaurant and the kitchen are prejudicial on the one hand to the quality of service because of the unavailability of the waiter during these times to attend to the needs of the patron, and, on the other hand to optimal food service and enjoyment since the lack of checking on food preparation can result in considerable amounts of standing of prepared foods in the kitchen before the dishes are served.

OBJECTS OF THE INVENTION

It is, therefore, the principal object of this invention to provide an apparatus for use in a restaurant which will overcome this disadvantage.

Another object of this invention is to provide an apparatus which is capable of signalling in a particularly effective manner a waiter in an eating room of a restaurant that a previously ordered food is available for pickup at the kitchen and can be served upon the patron with a minimum loss of time.

SUMMARY OF THE INVENTION

These objects and others which will become apparent hereinafter are attained, in accordance with the present invention, in an apparatus which comprises:

a principal treatment unit disposed in the area in which food or beverages are to be prepared and having a certain number of push buttons or the like, and a display device for the information reflected in the action exercised upon the buttons, at least a first board in the dining room of the restaurant, comprising means for displaying the information resulting from the action exercised on the buttons of the treatment unit, and a second board installed in the region at which the dishes or beverages which have been prepared are located and comprising display means similar to that of the treatment unit and a device for cancelling the display of the different boards and the treatment unit, the connection between the principal treatment unit and the two boards being realized such that the supply of information at the principal unit is translated into displays of information on that unit and on the two boards while an action at the second board permits cancellation of the display on the principal unit and on the two boards.

According to a feature of the invention, the device comprises:

a principal treatment unit disposed in the region of the preparation of the plates or beverages and provided with a source of electrical energy and a certain number of push buttons each associated with a luminous signal lamp corresponding to the push buttons of the principal unit so as to indicate the actuated push button, for example, by a number, at least one first board installed in the dining room of the restaurant and comprising a number of luminous signal lamps equal to the number of push buttons of the principal unit and corresponding indicia, i.e. having similar numbers, and a second board installed in the region from which the prepared plates or beverages can be taken and comprising a number of push buttons and possibly of luminous signal lamps equal to that of the principal unit and provided with indicia, e.g. numbers in the same fashion, the connection between the principal unit and the two boards being so realized that actuation of a push button on the principal unit results in illumination of the corresponding signal lamps respectively, on the principal unit and the two boards, while an actuation of the buttons corresponding to the second board, permits extinction of the signal lamps corresponding to that push button on the boards and the principal unit.

It has been found to be advantageous to mount the n luminous lamps of the principal unit and the two boards in parallel, row by row, and most preferably three by three, or four by four.

The signal lamps, especially those of the principal unit and the second board can each be integrated with the respective push buttons. Alternatively, each push button can be associated with a luminous signal lamp spatially independent of the push buttons. The signal lamps can be preferably constituted by electroluminescent diodes which have very low current consumption In a practical embodiment of the invention, the board located in the dining room comprises n signal lamps numbered from one to n, each of which corresponds to a table. According to the shape of the dining room, the n lamps can be grouped on a common support or disposed on a number of supports which can be separated from one another. When a dish is prepared to be served, the chef presses the push button whose number corresponds to that of the table for which the dish is destined.

This depression of the push button illuminates the signal lamps of the corresponding number on the principal unit and the two boards. The waiter observes the illumination on the board located in the dining room and is thus immediately informed that a plate is prepared for service at the numbered table. He can then go to the kitchen or a location at which the dish can be picked up, i.e. through a pass-through between the kitchen and the dining room and receive the dish. At the same time, he can depress the push button on the second board carrying the same number and extinguish the three signal lamps previously energized.

Advantageously, the principal unit comprises a programmable timing system which, as time passes, can cause a lamp which has been illuminated for an excessively long time, to flash so as to call attention to the delay in picking up the dish. Alternatively, or in addition, the program timer can cut off or extinguish a signal lamp which has been left on for a length of time sufficient to enable the conclusion that the light was left on improperly, or to light another lamp of a different color, for example, after a predetermined time, where the change of color will serve to alert a slow-acting waiter.

The duration before which one of these extraordinary actions are taken will, of course, correspond to the normal time for pickup of a dish without losing the quality and esthetic character. When this period expires, the change in state of the luminous signal previously energized can indicate to the waiter the urgency with which he should pick up the dish at the kitchen.

The principal unit may, according to another feature of the invention, be connected to a system for processing information and provided with a memory, i.e. a computer, for storing information related to the energization of the push buttons. The information processor at the end of a service period, such as a day, can provide information as to the number of plates served per table, the duration required in pickup of the dish after it has been considered ready at the kitchen and hence the response of the waiter, and the time required for service of a dish, or the number of times that the service of a dish has exceeded the time limits for proper service.

The analysis of these results allows the quality of service on the one hand and the productivity of each waiter on the other to be determined.

In another embodiment of the invention, the apparatus comprises:

a principal unit disposed in the region of food or beverage preparation and comprising a numerical and/or alphabetical keyboard and a display of information furnished by the keyboard, a first board in the dining room of the restaurant having a display for information furnished by the keyboard or related to the information furnished by the keyboard, and a second board in the region of pickup of the prepared food item which comprises a numerical/or alphabetical keyboard and a display for information supplied by the principal unit, the second board having means for cancelling the information supplied by the principal unit.

Advantageously, the first board has means for displaying codes capable of identifying the waiter while the principal unit and the second board comprises means for displaying codes corresponding to each table. A programmable calculator or computer responds to each table code displayed at the principal unit and the second board to display the server code on the first board associated with that table.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
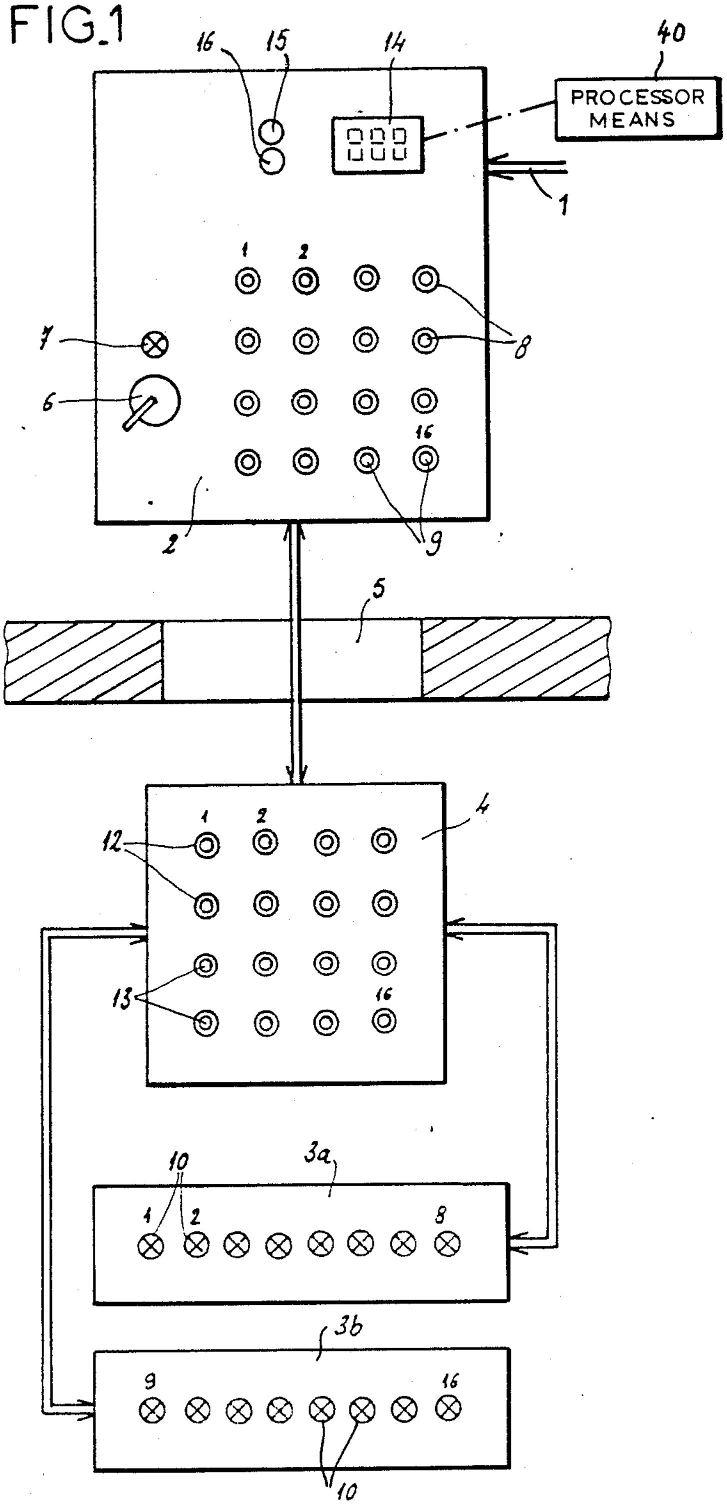
FIG. 1 is a block diagram schematically illustrating a first embodiment of the apparatus of the invention.

The apparatus shown in FIG. 1 is provided in a restaurant having a pass-through 5 between a kitchen shown above the pass-through and a dining room represented below the pass-through.

The apparatus comprises a principal or main unit 2 located in the kitchen, a first board, here shown as two boards 3a and 3b which can be located at different regions of the dining room, depending upon the shape and size of the latter, and a second board 4 located in the region of the kitchen but on the opposite side of the pass-through 5 therefrom, i.e. in the region at which a waiter can pick up a dish prepared in the kitchen.

The principal unit 2 comprises an electrical supply source 1, a circuit breaker or switch 6 for energizing the apparatus and a signal lamp 7 which is illuminated to show that the apparatus has been energized.

The principal unit 2 has sixteen push buttons 8, each of which is of conventional design and has at its center a signal lamp 9 which is illuminated when the push button is depressed initially, i.e. when the button 8 is activated.

The sixteen buttons are provided with indicia and are hence numbered 1 to 16.

Each of the boards 3a, 3b comprises eight luminous signal lamps (i.e. information and flagging lamps) generally indicated at 10 and each constituted, for example, by an electroluminiscent diode.

The lamps of board 3a are numbered 1–8, while the lamps of board 3b are numbered 9–16.

The board 4 also comprises sixteen push buttons identified by the reference character 12 and each can have a luminous signal lamp 13 constituting the center of the button and formed by a respective electroluminous diode.

The push buttons 12 are numbered 1–16 also. The connection between the principal unit 2 and the boards 3a, 3b and 4 is assured by a multiconductor cable. The electrical connection is effected such that the three lamps 9, 10 and 13 of the same number are connected in parallel and illuminate and extinguish simultaneously.

The principal unit can be also equipped with a readout 14 of the number of plates served per table, the mean duration during which a dish stands for a particular waiter or of all the waiters, and the number of times that the pickup of a dish takes longer than a predetermined duration. This display can be returned to zero by a button 16 and is actuated by a button 15.

In operation, when a food item is prepared in the preparation region for table 1, for example, the preparer presses the push button 8 bearing the number 1 to illuminate the lamps 9, 10 and 13 with the number 1. The illumination of lamp 10 in the dining room indicates to the waiter responsible for table number 1 that a dish destined to that table is ready to be served. The server returns to the kitchen and takes the dish through the pass-through 5 and presses the push button 12 for table 1 to extinguish the three lamps assigned to this table. Utilizing the timing device, it is possible, at the expiration of the waiting period which is predetermined, to flash the lights 9, 10 and 13 to attract the attention of the waiter to the urgency with which he should serve the prepared dish.

The information generated at the principal unit can be transmitted to a signal processing and memory unit 40, such as a computer, to determine the number of dishes served per table, the waiting time for plates at the pass-through before they are picked up by the waiter and the number of times in which a particular waiter has failed to pick up a dish in a predetermined period of time.

Figure 2:
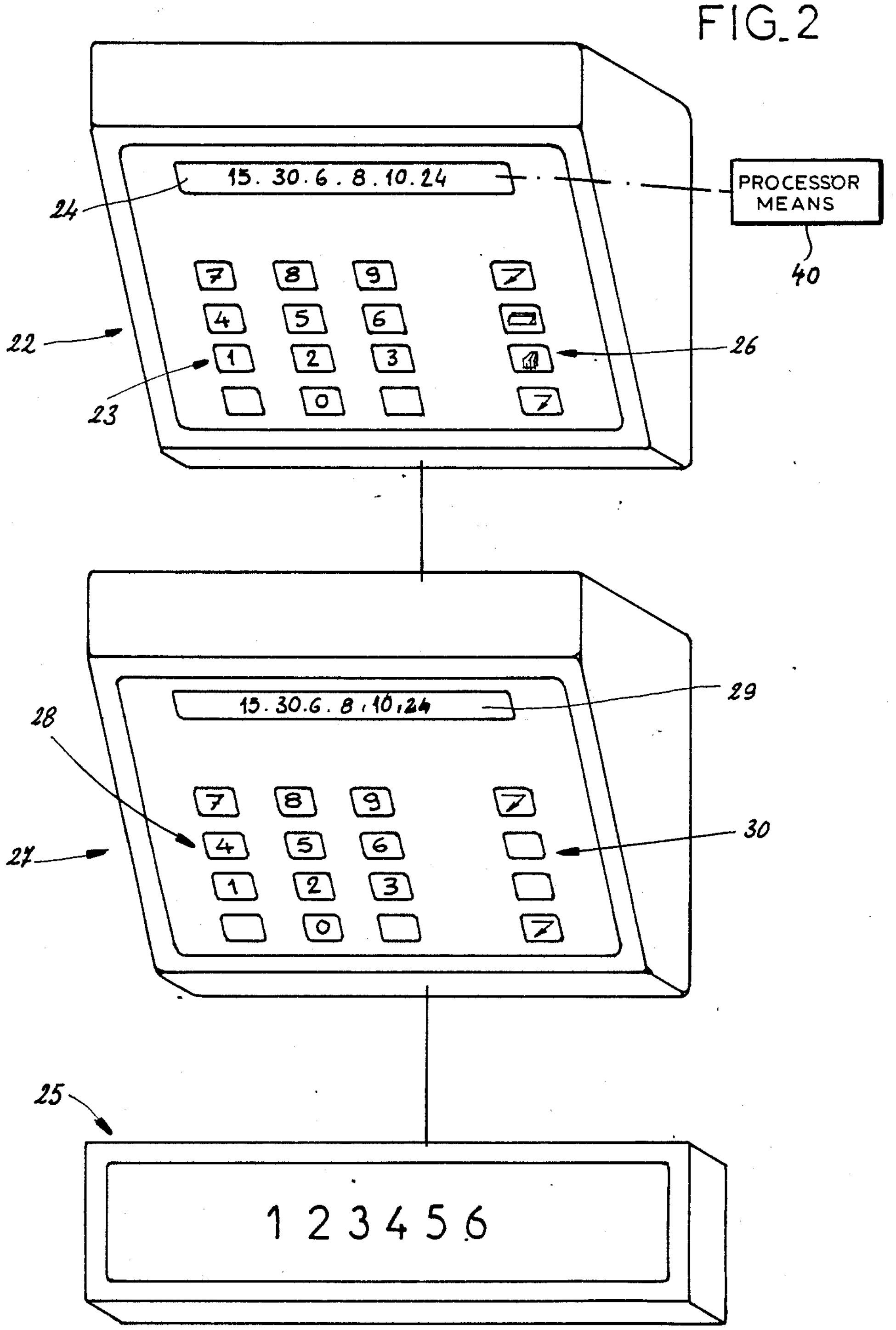
FIG. 2 is a diagram showing the principal unit and the display boards in accordance with a second embodiment of the invention.

FIG. 2 shows another embodiment of the invention wherein the principal unit 22, disposed in the preparation region, comprises a numerical keyboard 23 and a luminous display 24 of the information supplied by the keyboard.

When the cook is finished with a dish, he may key in on the keyboard 23 the number of the table for which the dish is intended. When a number of dishes are prepared, the numbers of the tables involved can be keyed in and displayed on the display in succession.

In the dining room a board 24 has a display with six illuminatable numbers, each representing a particular waiter.

The device is equipped with a computer which is programmed to automatically light the number on this latter display which is assigned to the waiter having charge of the table whose number has been keyed in on the principal unit.

The board 22 is provided with a plurality of buttons 26 which can serve for validation of information, programming, interruption and cancellation.

In the region at which the prepared food items are to be picked up, there is a second board 27 having a keyboard 28 similar to that of keyboard 23 and a luminous display 29 similar to that of the table 24. These displays can be liquid crystal displays on which the information can move from right to left.

The display of a number (of a table) on the device 24 is translated into a display of the same number on the luminous device 29. However, the waiter is alerted by the numbers displayed on the board 25 and, when he arrives to pick up the dish, with the aid of board 27, he can ascertain which table the dish is intended for. Upon picking up the dish, he can compose on the keyboard 28 the number of the table for which the dish is intended to validate that he has picked it up and cancel the display by the appropriate actuation of the buttons 30. The cancellation of the display on board 27 also cancels the display on board 22 of the number of the table and hence the display on board 25 of the number of the waiter.

The device of FIG. 2 thus has the same possibilities as the embodiment previously described, and it is possible to measure or respond to time of service, to flash the display on board 25 if a predetermined pickup time has been exceeded, etc.

It will be apparent that the invention affords considerable improvement in existing restaurant operations and provides an apparatus which allows a waiter to spend as much time as possible in attendance on patrons while nevertheless ensuring that prepared dishes will be served under the best conditions.

The invention is not, however, limited to the specific embodiments described by way of example and includes variants within the spirit and scope of the appended claims. For example, the number of tables in the dining room of the restaurant and their positioning can be varied and the number of display boards in the restaurant can also be varied. The apparatus can be used for the transmission of information between the bar and the dining room of the restaurant or between the kitchen and the service facilities of a hotel restaurant in which case the display lamps of the second board can be eliminated. The reading and result analysis means 14, 15 and 16 can be mounted within the casing of the principal unit or at a distance therefrom without departing form the spirit and scope of the invention.

I claim:

1. An apparatus for the transmission of information in a restaurant which comprises:

a main board disposed in a food-preparation region and comprising a number of push buttons and a display equipped with a plurality of signalling lamps for indicating activation of the respective push buttons, each of said lamps representing a respective number of a table to be served;

at least one first board in a dining room of the restaurant having a plurality of information lamps indicating numbers of tables to be served, each of said plurality of information lamps being connected with the respective one of said signalling lamps and being turned on upon the activation of the respective push button of the main unit;

a second board in a region between the food preparation region and the dining room at which a waiter can receive prepared food items and comprising another plurality of information lamps, each of said other plurality of information lamps being connected with the respective one of said signalling and information lamps, and means for cancelling the display of said boards and said main board, said main board and said first and second boards being electrically connected with one another such that the activation of one of said push buttons with a respective one of said signalling lamps of said main board turns respective information lamps of said first and second boards on thereby signalling preparation of a food item for a specific table and such that the cancellation of the display at said second board cancels corresponding displays at said main board and said first board by turning respective lamps thereof off; and processing means for storing and determining a duration during which a dish stands for a particular waiter and wherein said main board is provided with a programmable timer for changing the state of a display on at least said main board upon the lapse of a predetermined time of a dish awaiting pickup by a waiter.

2. A device for the transmission of information in a restaurant which comprises:

a main board disposed in a region of preparation of a food item and supplied with electrical imaging and having a plurality of push buttons each associated with a luminous signal lamp having indicia representing respective tables;

at least one first board in a dining room of the restaurant having a number of luminous information lamps equal to whose of said main board and the push buttons thereof and provided with corresponding indicia;

a second board located in a region at which a waiter can receive prepared food items from said region and comprising a number of push buttons and luminous flagging lamps equal to those of the main board and provided with corresponding indicia, each of said signal lamps being connected with the respective flagging and information lamps of the respective boards, said main board and said first and second boards being electrically connected with one another, so that the activation of a push button on the main board is translated into illumination of corresponding flagging and information lamps on said first and second boards and actuation of a push button on said second board extinguishes corresponding signal lamps of said main and first boards;

processing means for storing and determining a duration during which a dish stands for a particular waiter and wherein said main board is provided with a programmable timer for changing the state of a display on at least said main board upon the lapse of a predetermined time of a dish awaiting pickup by a waiter.

3. The apparatus defined in claim 2 wherein said signal, flagging and information lamps on said main, first and second boards are mounted in parallel rows.

4. The apparatus defined in claim 2 or claim 3 wherein each push button is associated with a lamp spatially independent of said push button.

5. The apparatus defined in claim 2 or claim 3 wherein each push button is provided with a lamp integrated with the respective push button.

6. The apparatus defined in claim 2 or claim 3 wherein each lamp is constituted by an electroluminous diode.

7. The apparatus defined in claim 1 or claim 2 wherein said main board is connected to an information processor having a memory and determining numbers of tables served, number of dishes served per table, mean duration for pickup of a dish after it has been prepared, and the number of times a predetermined pickup time has been exceeded.

8. The apparatus defined in claim 1 wherein said push buttons form parts of respective alphanumeric keyboards on said main board and said second board associated with respective alphanumeric displays.

9. The apparatus defined in claim 8 wherein said first board is provided with a waiter-indicia display responsive to a code preprogrammed in said first board and generated by the selection of the push button corresponding to a table at said first board in the charge of the waiter.

* * * * *